United States Patent [19]

Wong et al.

[11] 4,400,694

[45] Aug. 23, 1983

[54] MICROPROCESSOR BASE FOR MONITOR/CONTROL OF COMMUNICATIONS FACILITIES

[76] Inventors: Raphael W. H. Wong, 3943 Lincolnshire St., Annandale, Va. 22003; Robert R. Ryason, 6913 Ruskin St., Springfield, Va. 22150; Charles L. Rahm, 1344 Hilton Dr., Reynoldsburg, Ohio 43068

[21] Appl. No.: 99,367

[22] Filed: Dec. 3, 1979

[51] Int. Cl.[3] ........................ G08B 26/00; G05B 23/02

[52] U.S. Cl. .................................... 340/505; 340/514; 340/518; 340/825.06; 340/825.12; 340/825.51; 340/825.54

[58] Field of Search ............... 340/505, 506, 517, 518, 340/501, 503, 514, 152 T, 150, 151, 519-525, 147 LP, 825.06, 825.07, 825.1-825.13, 825.5, 825.51, 825.52, 825.54, 825.55; 179/5 R, 2 R

[56] References Cited

U.S. PATENT DOCUMENTS

| | | | |
|---|---|---|---|
| 3,516,063 | 6/1970 | Arkin et al. | 340/518 |
| 3,713,142 | 1/1973 | Getchell | 340/152 T |
| 3,806,872 | 4/1974 | Odom | 340/505 |
| 4,040,046 | 8/1977 | Long et al. | 340/152 T |
| 4,041,470 | 8/1977 | Slane et al. | 340/505 |
| 4,109,246 | 8/1978 | Budrys et al. | 340/147 LP |
| 4,162,488 | 7/1979 | Silverman et al. | 340/152 T |

*Primary Examiner*—Donnie L. Crosland
*Attorney, Agent, or Firm*—Robert P. Gibson; Anthony T. Lane; Saul Elbaum

[57] ABSTRACT

A monitor/control system for a communications network with an independent microprocessor at each repeater station and at the terminal, and in which alarms and monitored conditions are detected on an interrupt basis.

7 Claims, 10 Drawing Figures

LOGIC EQUATIONS OF OUTPUTS $I_I = Q \cdot \overline{MI}_O$ = INTERRUPT OUTPUT (WHEN I)

$MR_I = L + MR_O$ = MASK RESET (WHEN I)

$MI_I = MI_O + Q$ = MASK INTERRUPT (WHEN I)

$R_I = R_O$ = RESET (WHEN I)

$R = \overline{MR}_I \cdot R_O$ = RESET BUFFER (WHEN I)

$C = \overline{MR}_O + R$ = DO NOT ACCEPT NEW INTERRUPT

Q = MEMORY OUTPUT

+ = OR, · = AND, $\bar{A}$ = COMPLEMENT OF A

MICROPROCESSOR BASE FOR MONITOR/CONTROL OF COMMUNICATIONS FACILITIES

RIGHTS OF THE GOVERNMENT

The invention described herein may be manufactured, used, and licensed by or for the United States Government for governmental purposes without the payment to me of any royalty thereon.

The present invention is directed to an improved monitor/control system for a communications network.

It is necessary to provide an electrical monitor/control system to assist in the technical control operations of a digital communications network. Such a network would typically include at least one terminal and several types of repeater stations. During the operation of the communications network, various types of alarms such as alarms signalling the presence of defective equipment, and alarms signalling undesirable conditions at the site of the equipment, e.g. fire, intrusions, etc., occur.

The purpose of the present monitor/control system is to detect and store all such alarm conditions, to monitor performance parameters of the system (e.g. transmitter output power), to monitor and control service channel input/output, and to perform other functions as required, (e.g. automatic equipment testing).

The monitor/control system known in the prior art is of the type which utilized a single, computer controller and periodic sampling of alarms. In that system, the addition or deletion of alarms required major software changes, and the change the number of alarms a new sampling order and rate was necessary, which effectively meant a new system.

In distinction to the system of the prior art, the system of the present invention provides separate independent microcomputers at each repeater station and at the terminal, and detects alarms continuously on an interrupt basis. Thus, addition or deletion of alarms requires only the addition of the handler software as the sub-routine, and the interrupt method makes more efficient use of the service channel. Additionally, use of a plurality of microcomputers increases the information handling capacity of the system and improves reliability.

In the operation of the system, the alarms at each of the stations are detected, are processed by the local microprocessor and are stored locally. The critial information is determined by the software in the interrupt package in accordance with some preassigned hierarchal schedule, and is transmitted via the service channel to the microprocessor at the terminal. The status of all alarms and monitored information can be transmitted to the microprocessor at the terminal by a command, either periodically, or by request.

This system has the advantage of providing flexibility and large capacity. The computer at the terminal can handle almost an unlimited number of remote microprocessors, (monitor and alarm processor's) because very little is required of the computer for each such processor. If equipment is added to the communication facility an additional processor may be added without causing a large change in the computer at the terminal. A simple connection of the added processor to a vacant interrupt line or a re-ordering of the interrupt lines on the interrupt control is then made and the system is ready. Small equipment changes can be taken care of by the monitor and alarm processor's which handle the equipment. Priority changes can be made by changing the hardware line order and then changing the 8-bit code which identifies the interrupt in the software look-up table.

The use of more than one microcomputer or microprocessor provides several advantages. The microprocessors can run independently while performing their respective tasks; this allows more to be done by a slower cycle time processor. If all functions were performed by a centralized processor (e.g., a minicomputer), the tasks would have to be shared and the system would have a limit on how much it could accomplish.

The software can be specialized to a particular task when multiple processors are used, giving further efficiency. A change in one task would require a total new software change if a single processor is used, but only one of the many software handlers would need to be changed in the present microprocessor technical monitor/control.

Finally, the loss of one processor would not disable the entire technical monitor/control system. The loss of a single processor only loses the task which that processor controls whereas in a single-processor system, the failure of the processor leads to failure of the entire technical control system. In the present system, the breakup of tasks among different independent blocks makes fault detection and isolation of a malfunctioning microprocessor very easy.

It is thus an object of the invention to provide a monitor/control system for a digital communications network which requires the addition of only minimal software when an alarm is to be added or delected or when a particular task is to be changed.

It is a further object of the invention to provide such a monitor/control system which is flexible and which has a large information handling capacity.

It is still a further object of the invention to provide such a monitor/control system in which fault detection and fault isolation is facilitated.

It is still a further object of the invention to provide such a monitor/control system which is modular in nature and which lends itself to expansion.

It is still a further object of the invention to provide such a monitor/control system which is relatively easy to maintain.

The invention will be better understood by referring to the following drawings which:

Figure 1:
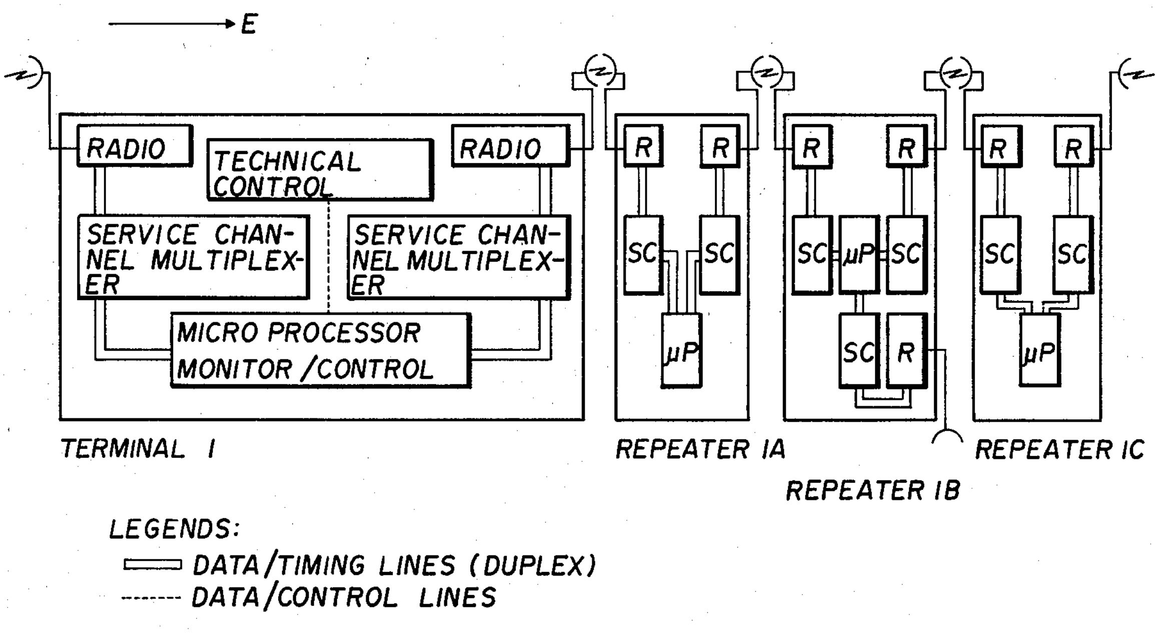
FIG. 1 is a general diagram of the microprocessor monitor/control configuration of the present invention deployed in a digital communications network having a terminal and repeater stations.

FIG. 1 shows a communications facility comprised of a terminal and three types of repeaters, in which the monitor/control system of the present invention is deployed. In FIG. 1, repeaters 1A and 1C represents either straight repeaters or drop/insert repeaters, while repeater 1B is a branching repeater. It is to be understood that there may be more than three individual repeaters in the communications facility and that the facility illustrated may be utilized in conjunction with other communications facilities having terminals.

Each of the microprocessors illustrated operates independently, except that its data is transmitted to the terminal microprocessor by the service channel. The data from the microprocessor at the terminal is then made available to the technical control for display, storage, and processing.

Figure 2:
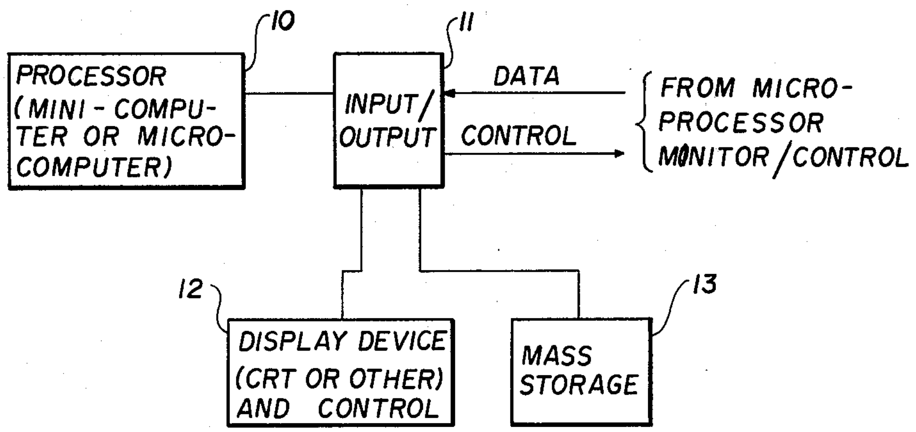
FIG. 2 is a block diagram which illustrates technical control at the communications network terminal.

This is illustrated in FIG. 2 where data processed by processor 10 at the terminal is displayed by terminal display device 12 and may be stored in mass storage device 13. Prime technical control responsibility of the terminal should be pre-assigned in one direction, for example east as is shown in FIG. 2, to the next terminal in the overall communication system.

Figure 3:
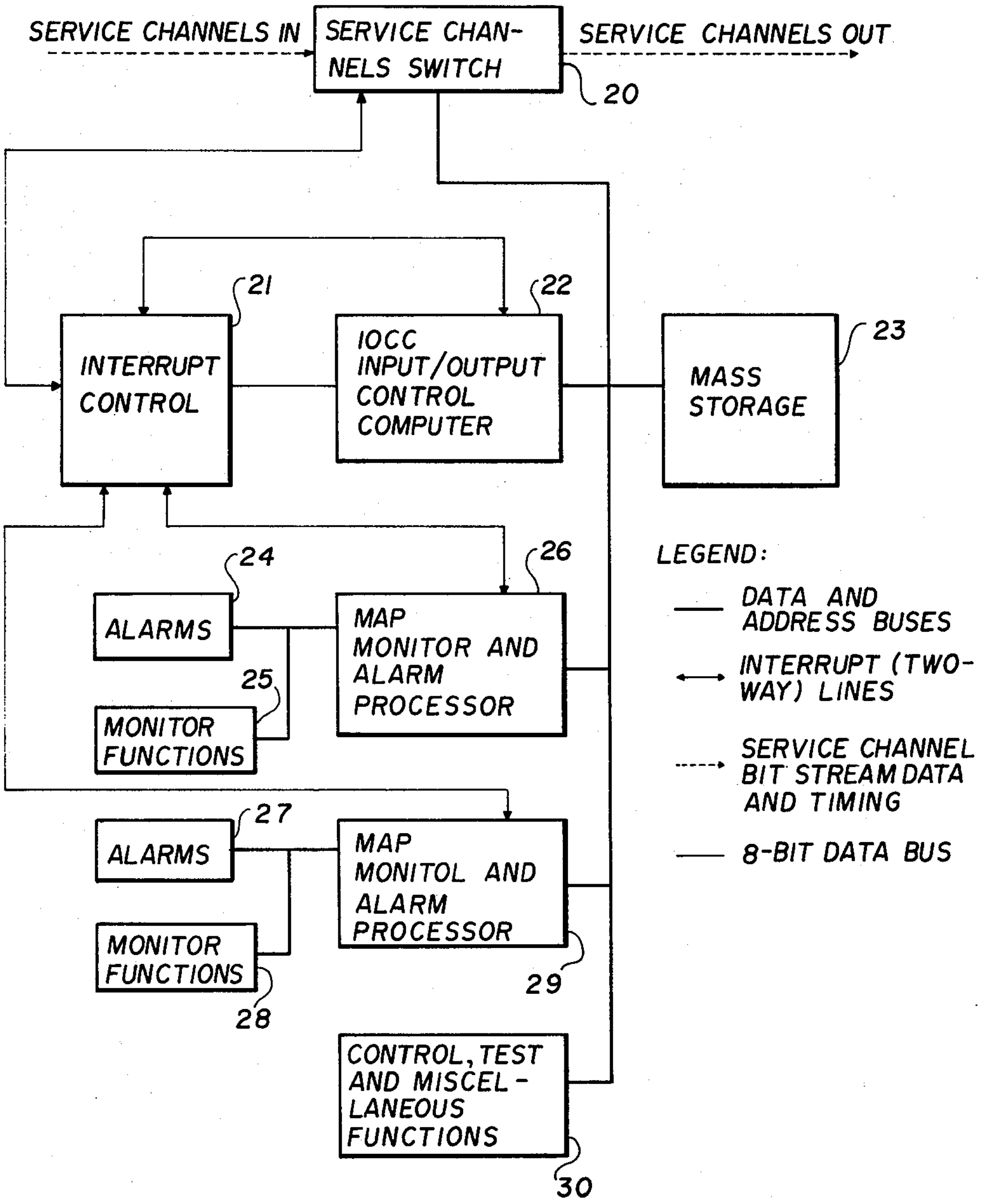
FIG. 3 is a block diagram of the monitor/control system of the invention.

FIG. 3 is a block diagram of the monitor/control system of the invention. The input/output control computer (IOCC) 22, the mass storage 23, and the interrupt control 21 are located at the terminal. Monitor and alarm processor (MAP) 26 is located at a first repeater station and monitor and alarm processor 29 is located at a second repeater station. The MAP's process alarms detected by alarm sensing means (such as 24), and control the monitoring of functions by monitoring means (such as 25). The detection of alarms and monitoring of functions is continuous, and when an alarm of sufficient criticality is detected, the IOCC 22 at the terminal is signalled by an interrupt control means 21. The monitor and alarm information is stored at mass storage device 23 at the terminal. Control, test, and miscellaneous functions block 30 represents any additional functions which must be controlled, tested, or performed. FIGS. 4 to 10 detail the hardware of the novel monitor/control system of the invention. Software for accomplishing the described functions is within the skill of one in the art.

Figure 4:
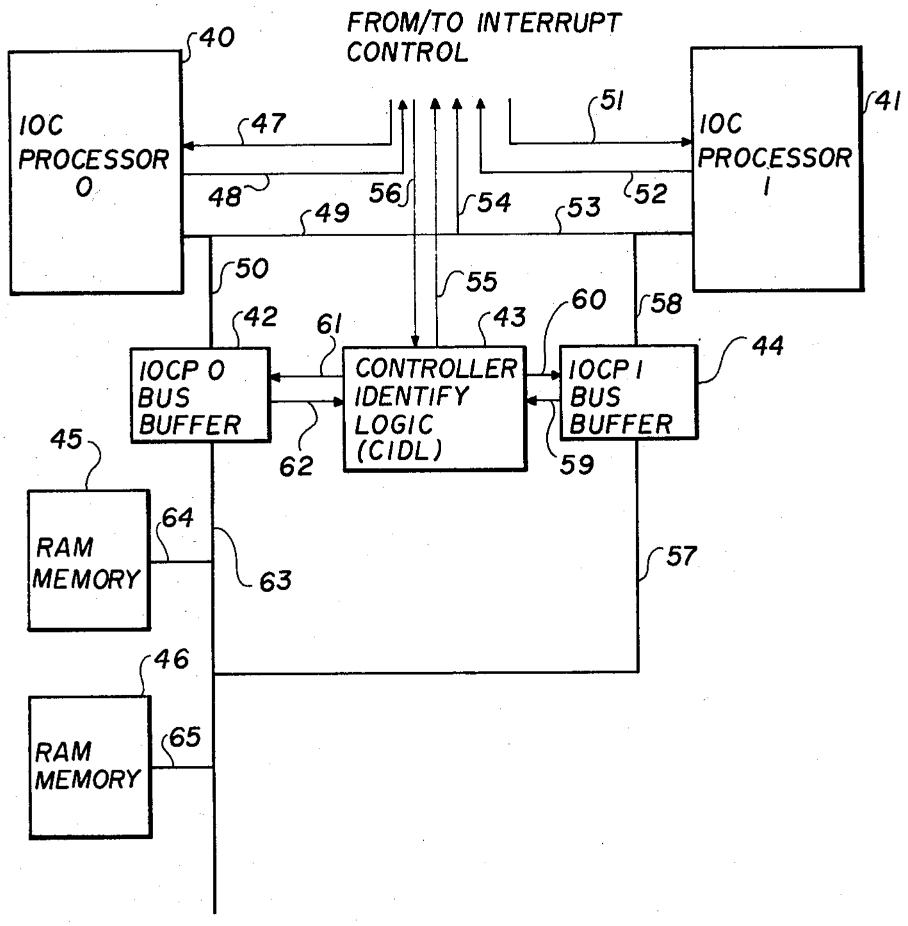
FIG. 4 is a block diagram of the input/output and control computer (IOCC).

The IOCC is the "brain" or the controller of the technical control facility. A block diagram of IOCC is shown in FIG. 4. As seen, there are two input/output and control processors (IOCPs) in the IOCC. These are shown as 40 and 41 in FIG. 4, and both IOCP's are operated in parallel, each receiving the same inputs from the IOCC data and control busses. The output of only one processor is passed by the IOCC bus buffers 42 and 44 to the IOCC busses. The controller identity logic 43 (CIDL) receives a signal from the interrupt control means which it sends to the IOCP bus buffers. This signal from the CIDL 43 determines which IOCP performs the controlling function. The other non-controller IOCP has its output masked by its bus buffer.

The input lines to each IOCP comprise the interrupt lines from the interrupt control means, the 8-bit data bus from the interrupt control means, and control lines from the IOCC busses through the bus buffer. The number of control lines depend on the microprocessor used for the IOCP. The outputs from each IOCP comprise control lines to the bus buffer, a 16-bit address bus to the bus buffer, and control lines to the interrupt control means to implement an IOCP controller change, that is, to switch control to the other IOCP. Additionally, an 8-bit data bus exists between each IOCP and its bus buffer.

The IOCC is programmed, so that the IOCP is effective to control the IOCC busses, memory, bus driver, and other IOCC components, handle all service channel switch standard routing, data insert/drop and data extraction and interpretation, handle all control functions and all testing of equipment not in use, issue commands to the monitor and alarm processors, control all data transfer along the IOCC busses, including handling of the mass storage, and handle all alarms of the technical control facility.

Figure 5:
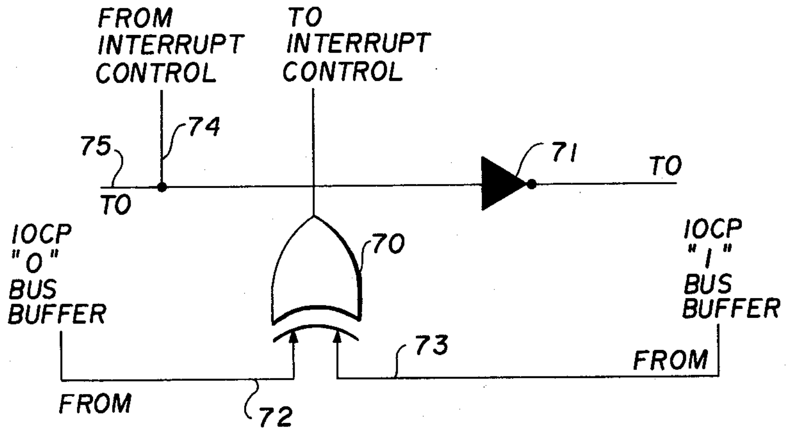
FIG. 5 is a circuit diagram of the controller identity logic (CIDL).

The controller identity logic (CIDL) is illustrated in FIG. 5. The CIDL relays control from the interrupt control means to the IOCP bus buffers to determine which IOCP is to perform the control function, and it composes the total parity outputs from the bus buffers and flags the interrupt control when the total parity outputs are different. The inputs to the CIDL are two total parity bits, one from each IOCP bus buffer (lines 72 and 73), and a processor flag from the interrupt control (line 74). If the flag is 0, then IOCP 0 is the controller and if the flag is 1 then IOCP 1 is the controller. The outputs of the CIDL are a parity difference alarm to the interrupt control and one line to each IOCP bus buffer to inhibit data output when the line is at logic 1.

Figure 6:
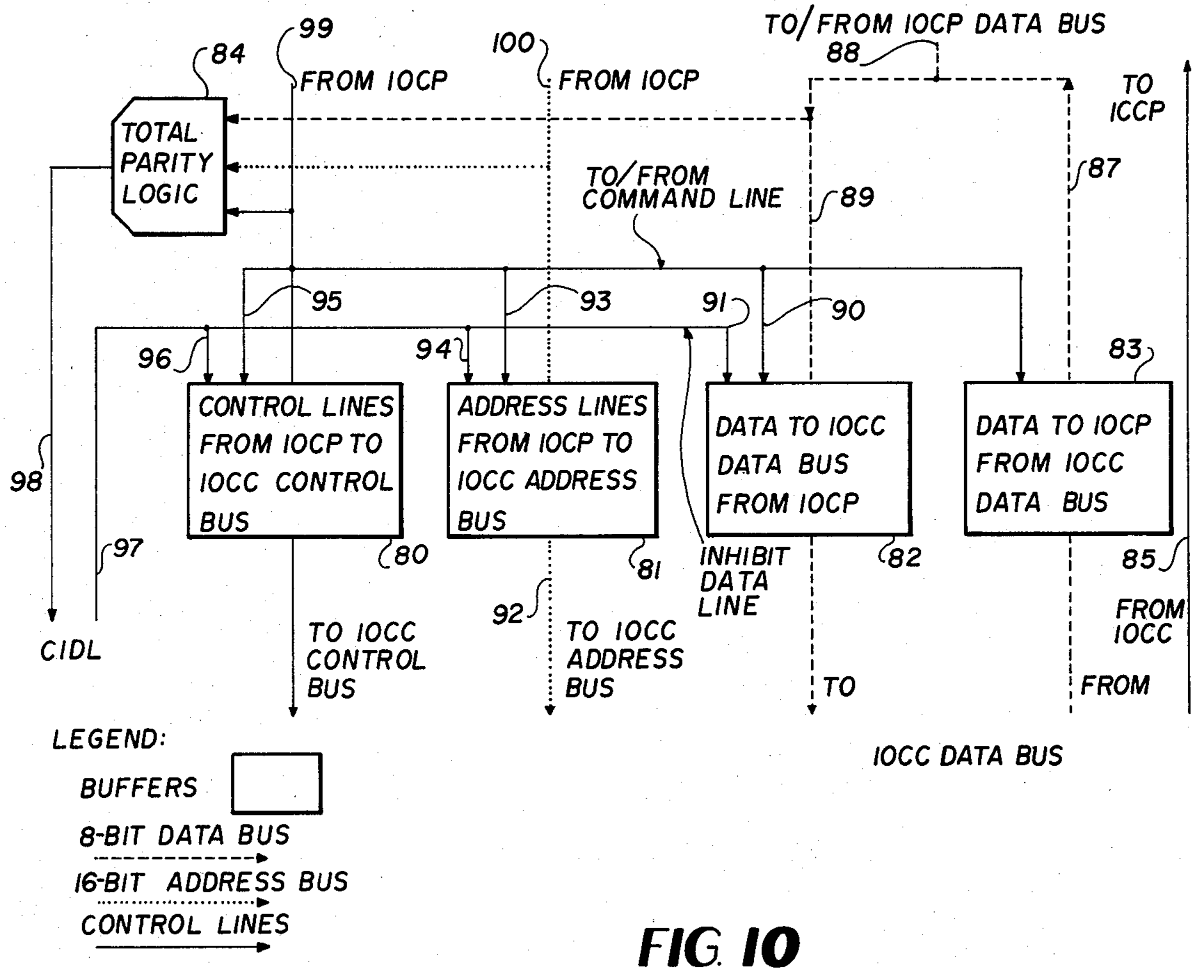
FIG. 6 is a block diagram of a bus buffer.

FIG. 6 is a block diagram of an IOCP bus buffer, and it is seen that the bus buffer is actually four buffers 80, 81, 82 and 83. This is simply because of the large number of busses going through the bus buffer. The bus buffer increases fan out of the data, control, and address line and busses, masks output from the IOCP to the busses if the line from the CIDL is high, and compares all IOCP output lines to determine total parity of the IOCP.

The following are the bus buffer' 2-way input/output bus lines; 8-bits of data from/to the IOCP, and 8-bits of data from/to the IOCC data bus. The following are the one-way busses through the bus buffers; 16 address bits from the IOCP to the IOCC control bus, n control bits from the IOCP to the IOCC control bus, and m control bits from the IOCC control bus to the IOCP. The inputs to the bus buffer are; inhibit data to the IOCC busses command from the CIDL and, data to/from the IOCP command line from the IOCP. The only output line is the total parity output to the CIDL.

Figure 7:
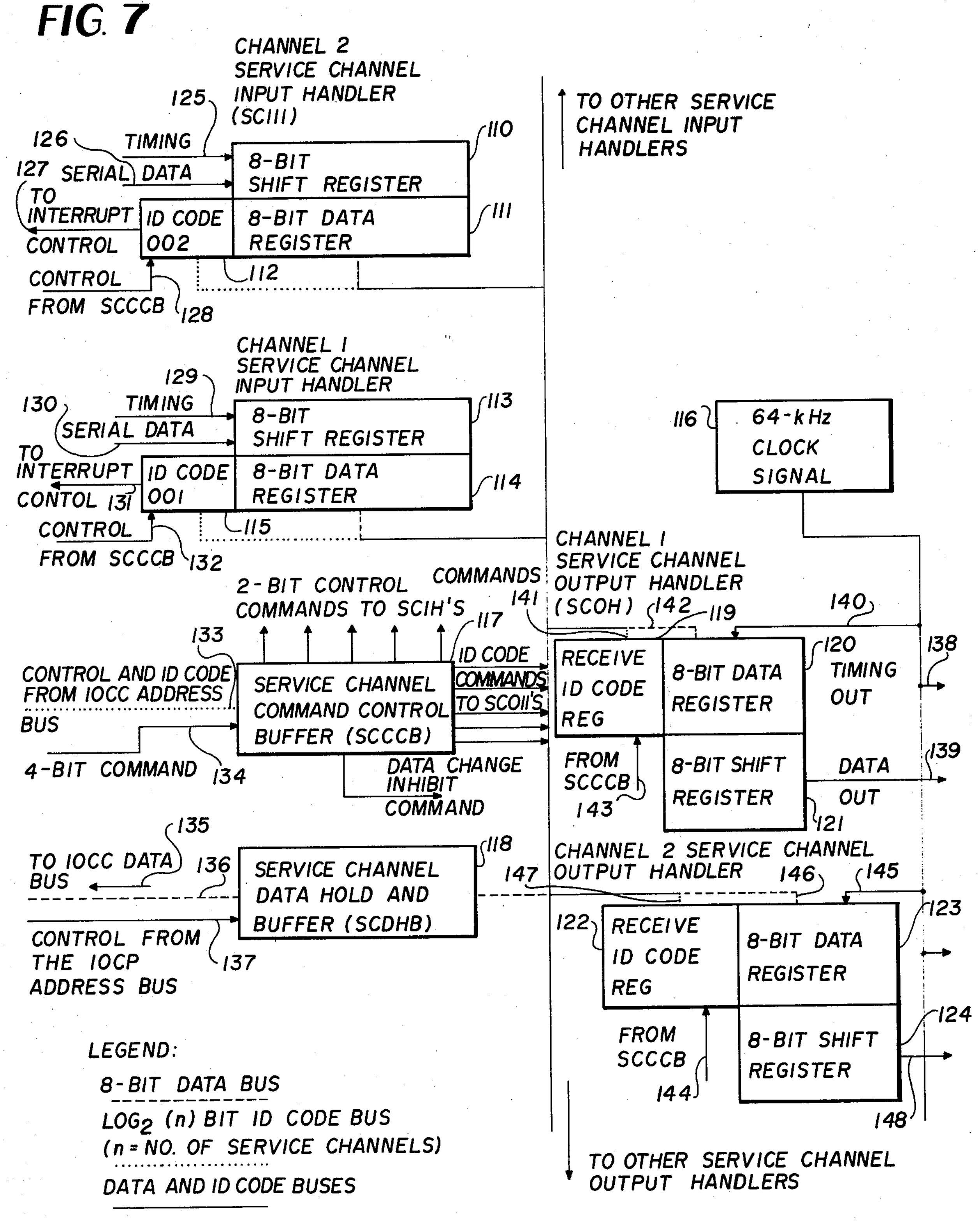
FIG. 7 is a block diagram of a service channel switch.

The block diagram of the service channel switch (SCS) is shown in FIG. 7. The SCS handles all the 64-kb/s service channels and it has four different hardware blocks. Each input service channel is given an ID code which is sent on to the ID code bus whenever necessary. All output handlers which have a particular ID code in their receive ID code register will automatically load the contents of their 8-bit data register when the ID code on the ID code bus matches the receive ID code register contents.

Referring to FIG. 7, the service channel input handlers receive data automatically from the service channel and the data is received at a rate determined by the timing from the service channel. The 8-bit shift register (110 and 113 in FIG. 7) automatically transfers data with the data transfer clock signals. The data transfer clock is just a 3-bit counter which can be "resynched" (set to 0) by the command interpreter and ID code register for the purpose of maintaining data word synchronization. The ID code register and command interpreter receives commands from the service channel command and control buffers (SCCCB's) and acts on them as described below.

The inputs to the 8-bit shift register are (1) timing signal (64 kHz) from MUX 1, (2) reset receive flag, (3) data (NRZ—non-return to zero, 64 kb/s, synchronous) from MUX 1, and (4) resynchronization of new data receive, flag, and data transfer clock.

The outputs from the 8-bit shift register are (1) parallel 8 bits to 8-bit data hold register (8 kHz), and (2) new data receive (8 bits sent to hold register) flag, every 8 bits to the IOCP interrupt control. The inputs to the 8-bit data hold register are (1) 8 bits (parallel every 125 μs) from 8-bit shift register, and (b 2) output data to the SCS bus command line. The outputs from the 8-bit data hold register are 8 bits parallel to the SCS bus.

The input to the ID code register and control command interpreter (IDCRCCI) is a 2-bit command code from the SCCCB, identified as follows. 00=no output from data hold and/or ID code registers, 01=output only the ID code register, 10=reset (resynch) the new data receive flag and data transfer clock, 11=output both data hold and ID code registers and reset new data receive flag.

The functions and outputs from the IDCRCCI are as follows: (1) reset the new data receive flag, to the 8-bit shift register, (2) reset and resynchronize the new data receive flag and data transfer clock in the 8-bit shift register, (3) output data command to the 8-bit data hold register, and (4) output log n (where n is the total number of service channels being switched) bit to the SCS bus.

Figure 8:
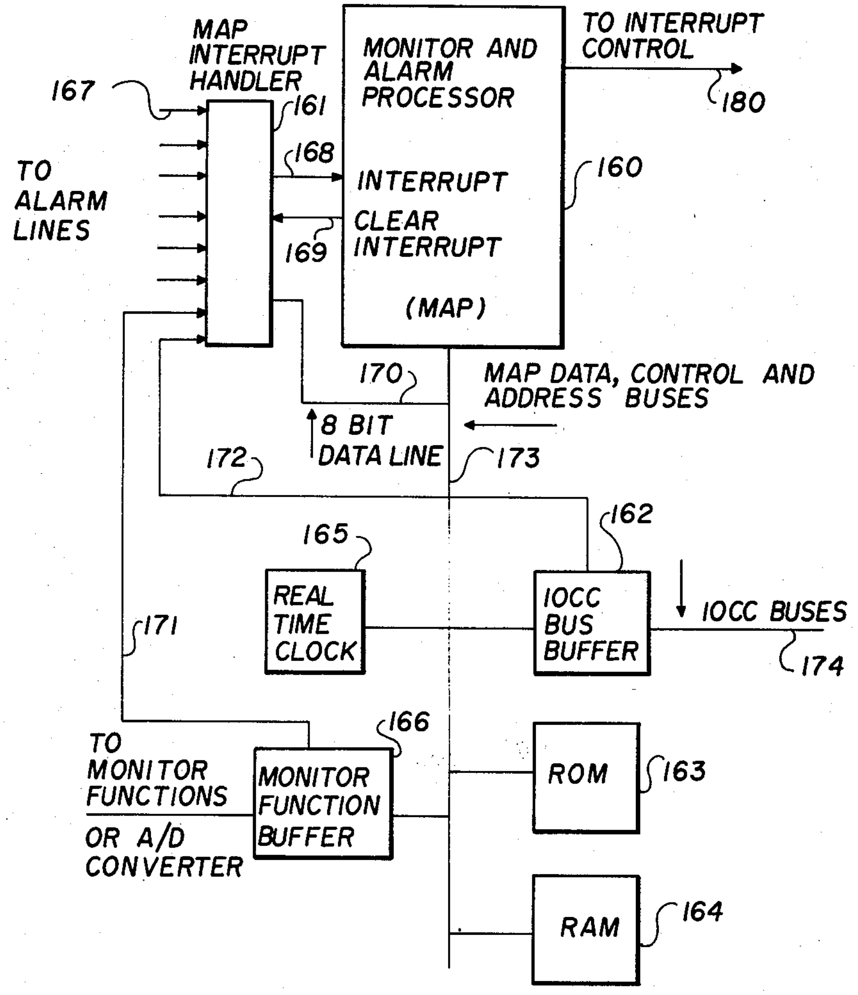
FIG. 8 is a block diagram of a monitor and alarm processor (MAP).

FIG. 8 is a block diagram of a monitor and alarm processor (MAP). The MAP is basically a microprocessor combined with a software control system comprised of a read only memory and/or random access memory. The combination of microprocessor and memory is a microcomputer.

The MAP monitors all alarms simultaneously. All alarms along with other interrupts are single line inputs to MAP interrupt handler 161. Any line that goes high signals an interrupt, and once an interrupt occurs the line is decoded into an 8-bit interrupt ID code which is outputted to the MAP data bus where the MAP reads and identifies the interrupt. Once the interrupt is identified, the MAP will store the alarm ID and the specific time that the alarm is recorded is provided by the real time clock 165. Typical equipment alarms are loss of multiplexer power and loss of frame, and typical site alarms are fire, high temperature, etc. The specific means for sensing these alarm conditions are known and form no part of the present invention.

Each monitored function is sent into a buffer 166. The buffer changes the signal into one or more 8-bit words of data. The buffer then sends an interrupt signal into the interrupt handler 161 on line 171 and the MAP then proceeds to extract the data from the buffer and operates on and stores the information as dictated by its program.

If two or more interrupts occur at the same time, the interrupt handler automatically acts on the most important interrupt as predetermined by the hardware. Every interrupt has a priority rating and no two interrupts have the same priority. Once an interrupt operation has been completed by the MAP, that interrupt is cleared and a new interrupt is operated on. All alarms are buffered and held until cleared by the MAP. If an alarm time duration is important, then an interrupt is given once the alarm occurs and again once the alarm is stopped.

Alarms which may occur twice or more before normal interrupt processing is finished can be sent into an up/down counter which counts up for each alarm and down for each clear interrupt command. Any alarm problems or peculiarities will be handled by the alarm buffer, according to the alarm priority and the program used by the MAP for that alarm. Alarm buffers are designed to accept a particular alarm and present that alarm as one or more transistor-transistor logic level interrupts. Alarm buffers are therefore supplied on a one to one basis with each alarm.

The MAP also communicates with the IOCP using the IOCC busses. The MAP may also interrupt the IOCP by sending an interrupt to the interrupt control means, which is the IOCP's equivalent of the MAP's interrupt handler.

Thus, the MAP records and processes alarms and monitors function data, and relays major alarms to the IOCC for action. A 16-bit address bus 173 and an 8-bit data bus 170 are connected to the MAP. Additionally, control in and control out busses are connected. The MAP has an input on its interrupt line 168 from the MAP interrupt handler and has clear interrupt output line 169 into the interrupt handler, and interrupt output line 180, which is fed to the interrupt control.

The real time clock 165 may be arranged to give the actual time with as much accuracy as is necessary. This clock may be arranged to give the time information in one or more 8-bit sections when commanded by the MAP.

Figure 9:
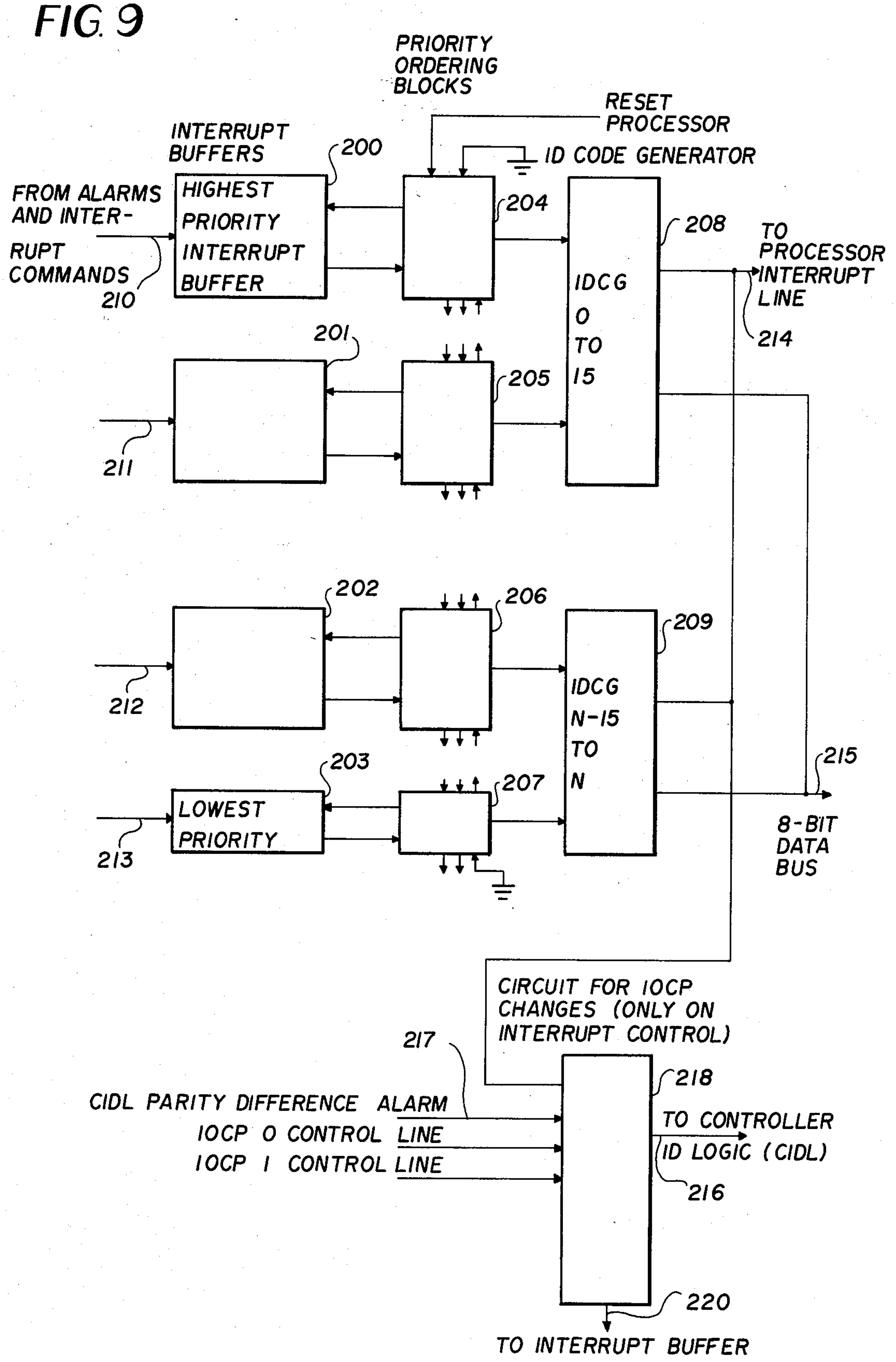
FIG. 9 is a block diagram of a MAP interrupt handler and interrupt control.

FIG. 9 is a block diagram of the MAP interrupt handler. The interrupt handler and the interrupt control means are identical except for an extra circuit included in the interrupt control means. This extra circuit is used to determine whether a change of IOCC controller is necessary and to give the CIDL the proper command.

The rest of the interrupt control means and a whole MAP interrupt handler comprise three groups of hardware. As shown in FIG. 9, these are interrupt buffers, priority ordering blocks, and interrupt ID code generators. The interrupt buffers shown as 210–213 in FIG. 9 are simply circuits which hold the interrupt until reset by the processor. The buffers are responsible for changing the interrupt into one or more interrupt signals to be sent to the priority ordering block. The buffer hardware is determined by the interrupt it must buffer, and every buffer receives a reset line from its priority ordering block and outputs one line to its priority ordering block.

Figure 10:
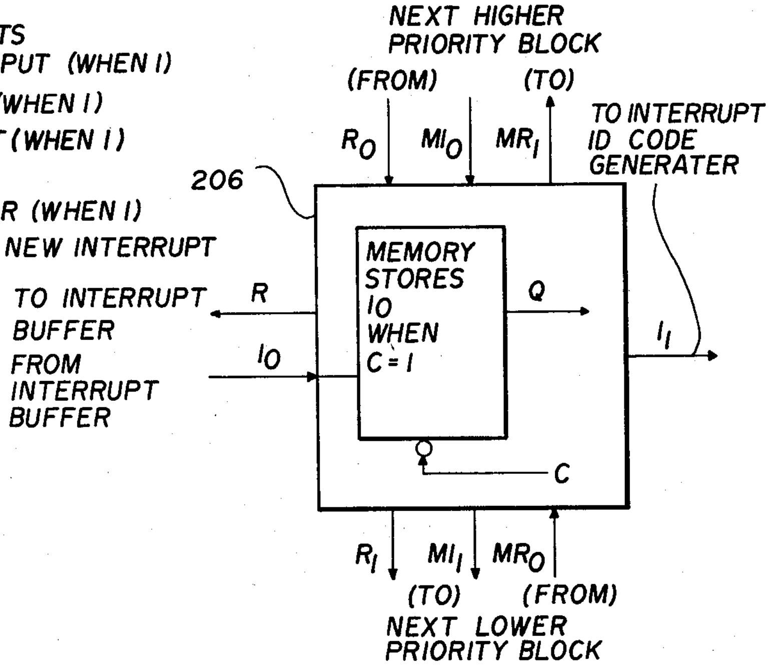
FIG. 10 is a diagram illustrating a priority ordering block.

As shown in greater detail in FIG. 10, the priority ordering blocks, represented as 204–207 in FIG. 9, are simply a group of digital logic circuits with one storage or memory bit which stores a new interrupt line status when the C input is high. This is done to prevent logic racing or oscillations. The priority ordering block has four inputs and five outputs as shown in FIG. 10. Basically, if an interrupt occurs, the highest order block which has a high interrupt line, $I_0$, from the interrupt buffer sends a signal $MI_1$ (mask interrupt), down to lower priority blocks and a signal $MR_1$ (mask reset and memory change) up to the higher priority blocks to prevent them from being reset.

The reset is sent to the buffer only when $R_0$ (the reset input from higher block and iltimately from the processor) is high and the interrupt to the interrupt (ID) code generator, $I_1$, is high (i.e., $I_1$ is the interrupt which was sent to the processor).

The interrupt identity code generator, shown as 208 and 209 in FIG. 9, automatically sends any interrupt input from the interrupt priority blocks on the processor interrupt line. It also sends an ID 8-bit code to the data bus after the interrupt has been received by the processor.

The circuit for IOCP change 218, monitors four parameters and then determines which IOCP should be the controller of the IOCP. When a controller change is necessary the circuit simply toggles the line to the CIDL and sends an interrupt to the IOCP's informing them of the change. If a CIDL parity difference alarm is sent, then an alarm is sent to the processor like any other alarm and the processor does a diagnostic on itself.

The circuit to determine controller changes evaluates the processor interrupt line, the IOCP 0 control line and the IOCP 1 control line. The IOCP is changed on three conditions. The highest priority condition is given if any interrupt to the IOCP is not reset within 100 microseconds. The program of the IOCP is arranged to clear every interrupt 100 microseconds after it occurs to maintain the service channels data flow; therefore, failure to do this means the controller is not functioning. The other two conditions have the same priority: if either IOCP calls for a controller change, then the IOCP is changed.

I wish it to be understood that I do not desire to be limited to the exact details of construction shown and described, for obvious modifications can be made by a person skilled in the art.

We claim:

1. A system for providing monitor, alarm and control functions for a communications network wherein said communications network comprises at least one main terminal and a plurality of repeater stations, said system comprising:

- a main terminal microcomputer located at said main terminal;
- a repeater station microcomputer located at each of said repeater stations;
- means for communicating between each of said repeater station microcomputers and said main terminal microcomputer;
- control and test means for enabling said main terminal microcomputer to cause a selected repeater station microcomputer to perform selected control and test functions at a selected repeater station;
- sensor means at each of said repeater stations for sensing the presence of alarm conditions at said repeater station and for immediately communicating said alarm conditions to said repeater station microcomputer;
- monitoring means at each of said repeater stations for continuously monitoring selected operational conditions at said repeater station and for communicating said operational conditions to said repeater station microcomputer;
- means, within each of said repeater station microcomputers, for immediately assigning a different priority value to each of said sensed alarm conditions and said sensed operational conditions in accordance with predetermined priority criteria;
- processor means, within each of said repeater station microcomputers, for continuously processing said sensed alarm conditions and said sensed operational conditions in order of said assigned priority value;
- storage means, within each of said repeater station microcomputers, for storing said processed alarm conditions and operational conditions; and
- interrupt means for immediately communicating to said main terminal microcomputer processed alarm conditions and operational conditions with a priority value above a predetermined value.

2. A system, as recited in claim 1, further comprising: interrogation means at said main terminal microcomputer for interrogating each of said repeater station microcomputer storage means at periodic intervals or upon command, to communicate to said main terminal microcomputer said alarm conditions and said operational conditions stored in said repeater station microcomputer storage means.

3. A system, as recited in claim 2, further comprising: display means at said main terminal microcomputer for displaying said communicated alarm conditions and operational conditions.

4. A system, as recited in claim 3, further comprising: storage means at said main terminal microcomputer for storing said communicated alarm conditions and operational conditions.

5. A system, as recited in claim 4, wherein said main terminal microcomputer comprises a first microprocessor and a second microprocessor whereby said communicated alarm conditions and operational conditions are divided between said first and second microprocessors.

6. A system, as recited in claim 1, wherein the main terminal microcomputer further comprises interrupt control means for receiving and processing said communicated alarm and operational conditions, including:

- priority assignment means for assigning to the received alarm and operational conditions, respectively, different priority values in accordance with predetermined priority criteria; and
- processing means for continuously processing the received alarm and operational conditions in order of the assigned priority values.

7. A system, as recited in claim 6, wherein the main terminal microcomputer includes a first microprocessor and a second microprocessor, and the interrupt control means of the main terminal microcomputer further comprises:

- microprocessor selecting means for selecting one of the two microprocessors for processing each received alarm or operational condition;
- timing means for determining the processing time of each alarm and operational condition within the operating microprocessor; and
- microprocessor changing means for changing the operating microprocessor whenever the processing time of any alarm or operational condition exceeds a predetermined maximum processing time, indicating a microprocessor malfunction.

* * * * *